(12) United States Patent
Kobayashi et al.

(10) Patent No.: US 11,152,136 B2
(45) Date of Patent: Oct. 19, 2021

(54) COMPOSITE CABLE

(71) Applicants: SUMITOMO WIRING SYSTEMS, LTD., Mie (JP); SUMITOMO ELECTRIC INDUSTRIES, LTD., Osaka (JP)

(72) Inventors: Kenta Kobayashi, Mie (JP); Akira Kitabata, Mie (JP); Takaya Kohori, Tochigi (JP); Masayuki Ishikawa, Tochigi (JP)

(73) Assignees: SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 41 days.

(21) Appl. No.: 16/361,953

(22) Filed: Mar. 22, 2019

(65) Prior Publication Data

US 2019/0295741 A1  Sep. 26, 2019

(30) Foreign Application Priority Data

Mar. 26, 2018  (JP) .............................. JP2018-058367

(51) Int. Cl.
*H01B 7/18* (2006.01)
*H01B 7/04* (2006.01)
(Continued)

(52) U.S. Cl.
CPC ............. *H01B 7/18* (2013.01); *B60R 16/023* (2013.01); *H01B 1/02* (2013.01); *H01B 3/30* (2013.01);
(Continued)

(58) Field of Classification Search
CPC ....... H01B 11/20; H01B 11/12; H01B 11/125; H01B 11/1895; H01B 11/203;
(Continued)

(56) References Cited

U.S. PATENT DOCUMENTS 2,109,334 A * 2/1938 Kaden .................... H01B 11/06
174/108
2,133,863 A * 10/1938 Knoderer ............... H01B 7/226
174/106 R
(Continued)

FOREIGN PATENT DOCUMENTS

CN   203733500 U   7/2014
CN   204242619 U   4/2015
(Continued)

OTHER PUBLICATIONS

China Official Action issued in Chinese patent application No. 201910203888.1, and English translation thereof, dated Apr. 26, 2020.
(Continued)

*Primary Examiner* — William H. Mayo, III
*Assistant Examiner* — Krystal Robinson
(74) *Attorney, Agent, or Firm* — Greenblum & Bernstein, P.L.C.

(57) ABSTRACT

A composite cable which makes it possible to improve disconnection resistance of a signal line. The composite cable includes a signal line part, a pair of power supply lines, and a sheath. The signal line part is composed of a first signal line and a second signal line twisted together. Each of the first signal line and the second signal line is composed of a pair of wires twisted together. The sheath covers an outer circumference of a wire bundle composed of the signal line part and a pair of power supply lines, the signal line part and the pair of power supply lines being twisted together. The signal line part is covered with a shield conductor formed of a conductive element wire spirally wound around the outer circumference of the signal line part.

20 Claims, 3 Drawing Sheets

(51) Int. Cl.
*H01B 1/02* (2006.01)
*H01B 9/00* (2006.01)
*H01B 3/30* (2006.01)
*B60R 16/023* (2006.01)
*H01B 11/02* (2006.01)

(52) U.S. Cl.
CPC .............. *H01B 7/04* (2013.01); *H01B 9/006* (2013.01); *H01B 11/02* (2013.01)

(58) Field of Classification Search
CPC .... H01B 7/0045; H01B 9/003; H01B 11/002; H01B 11/1008; H01B 11/1091; H01B 11/1826; H01B 11/1869; H01B 13/0841; H01B 3/445; H01B 7/00; H01B 7/02; H01B 7/0216; H01B 7/048; H01B 7/0861; H01B 7/0892; H01B 7/1845; H01B 7/1855; H01B 7/1865; H01B 7/1875; H01B 7/2825; H01B 7/288; H01B 7/30; H01B 9/00; H02G 11/006; H02G 1/1202; H02G 3/0406; H02G 3/0462; H02G 3/22; H02G 3/32
See application file for complete search history.

(56) References Cited

U.S. PATENT DOCUMENTS

| | | | | |
|---|---|---|---|---|
| 2,222,932 | A * | 11/1940 | Bennett | H01B 9/02 174/10 |
| 2,386,753 | A * | 10/1945 | Shield | H01B 11/00 174/36 |
| 2,425,294 | A * | 8/1947 | Morgan | H01B 13/012 310/208 |
| 5,216,204 | A * | 6/1993 | Dudek | H01B 11/1025 174/102 SC |
| 5,834,698 | A * | 11/1998 | Izui | H01B 9/003 174/113 R |
| 6,018,816 | A * | 1/2000 | Tateyama | H04L 1/0061 358/462 |
| 9,545,888 | B2 | 1/2017 | Ito et al. | |
| 9,881,716 | B2 | 1/2018 | Hayakawa et al. | |
| 10,115,500 | B2 | 10/2018 | Hayakawa et al. | |
| 10,297,367 | B2 | 5/2019 | Hayakawa et al. | |
| 2007/0173984 | A1 * | 7/2007 | Nakayama | B60T 7/12 701/1 |
| 2010/0025072 | A1 * | 2/2010 | Okano | H01B 11/1008 174/115 |
| 2010/0218970 | A1 * | 9/2010 | Eshima | H01B 13/141 174/108 |
| 2011/0278043 | A1 * | 11/2011 | Ueda | H01B 7/1895 174/115 |
| 2012/0111602 | A1 * | 5/2012 | Wei | H01B 7/0861 174/114 R |
| 2013/0277087 | A1 * | 10/2013 | Hayakawa | H01B 3/50 174/107 |
| 2014/0190741 | A1 * | 7/2014 | Hayakawa | B60R 16/0215 174/72 A |
| 2015/0165987 | A1 * | 6/2015 | Hayakawa | H01B 3/30 174/72 A |
| 2015/0165988 | A1 | 6/2015 | Hayakawa et al. | |
| 2016/0078981 | A1 * | 3/2016 | Kumada | H01B 9/003 174/72 A |
| 2016/0176369 | A1 * | 6/2016 | Ito | B60R 16/0207 174/72 A |
| 2016/0339854 | A1 | 11/2016 | Hayakawa et al. | |
| 2017/0229212 | A1 * | 8/2017 | Hayakawa | B60R 16/0215 |
| 2017/0263353 | A1 | 9/2017 | Hayakawa et al. | |
| 2018/0134239 | A1 | 5/2018 | Hayakawa et al. | |
| 2018/0144845 | A1 | 5/2018 | Hayakawa et al. | |
| 2019/0019602 | A1 | 1/2019 | Hayakawa et al. | |

FOREIGN PATENT DOCUMENTS

| | | |
|---|---|---|
| CN | 205376200 U | 7/2016 |
| CN | 206595514 U | 10/2017 |
| JP | 5-38713 U | 5/1993 |
| JP | 5594446 B2 | 9/2014 |
| WO | 2016/151753 A1 | 9/2016 |

OTHER PUBLICATIONS

Office Action issued in Chinese Patent Application No. 201910203888.1, dated Nov. 10, 2020 and the English machine translation thereof.
Chinese Official Action received in CN Application No. 201910203888.1, dated Apr. 8, 2021, and English language translation thereof.

\* cited by examiner

COMPOSITE CABLE

CROSS-REFERENCE

The present application claims priority under 35 U.S.C. § 119 to Japanese Application No. 2018-058367, filed on Mar. 26, 2018, entitled "COMPOSITE CABLE". The contents of this application are incorporated herein by reference in their entirety.

TECHNICAL FIELD

The present invention relates to a composite cable.

BACKGROUND ART

In recent years, an electric brake electrically controlled has attracted attention in automobile field. For example, Patent Document 1 discloses a composite cable for use in an electric brake, which includes one signal line that is composed of a pair of wires and is connected to a sensor for measuring a rotation velocity of a wheel, and two power supply lines connected to a brake caliper.

PRIOR ART LITERATURE

Patent Document

Patent Document 1 Japanese Patent No. 5594446

SUMMARY OF THE INVENTION

Whereas, in the conventional composite cable, for example, when one end side of the cable is fixed to a vehicle body, and the other end side of the cable is attached to a portion around a wheel where vertical vibration arises, the cable is also subjected to vibration caused by multiple shaking mainly including large horizontal shaking of the cable (shaking in a longitudinal direction of an automobile) when subjected to vertical vibration in a bending state. For this reason, the conventional composite cable has such an issue that the signal line is easily disconnected around a portion for fixing the cable.

The present invention has been made in view of such a background, and it is intended to provide a composite cable which makes it possible to improve disconnection resistance of a signal line.

One aspect of the present invention is a composite cable, including:

a signal line part including a first signal line composed of a pair of wires twisted together;

a pair of power supply lines;

a sheath that covers an outer circumference of a wire bundle composed of the signal line part and the pair of power supply lines, the signal line part and the pair of power supply lines being twisted together;

wherein the signal line part is covered with a shield conductor formed of a conductive element wire spirally wound around an outer circumference of the signal line part.

Effects of the Invention

The composite cable has the above-mentioned configuration. In particular, the signal line part of the composite cable is covered with a shield conductor formed of a conductive element wire spirally wound around an outer circumference of the signal line part. This shield conductor improves the shape retainability of the signal line part. Thus, even when the composite cable is subjected to vertical vibration in a bending state, it becomes hard for the signal line part to bend rapidly, so that tensile force to be applied to the first signal line can be reduced. Further, in the composite cable, the rigidity of the cable is improved by the shield conductor in comparison with the conventional composite cable that has no shield conductor provided. Consequently, it is made possible to restrain the horizontal shaking of the composite cable when subjected to vertical vibration in a bending state. In addition, because the shield conductor has almost no restriction in movement of the conductive element wire when the cable is horizontally shaking so as to produce gaps between the winding of the element wire, the composite cable is excellent in followability to bending and has good flexibility.

Accordingly, the composite cable 1 makes it possible to enhance the disconnection resistance of the first signal line 21.

DETAILED DESCRIPTION

Representative Embodiments

Embodiment 1

Figure 1:
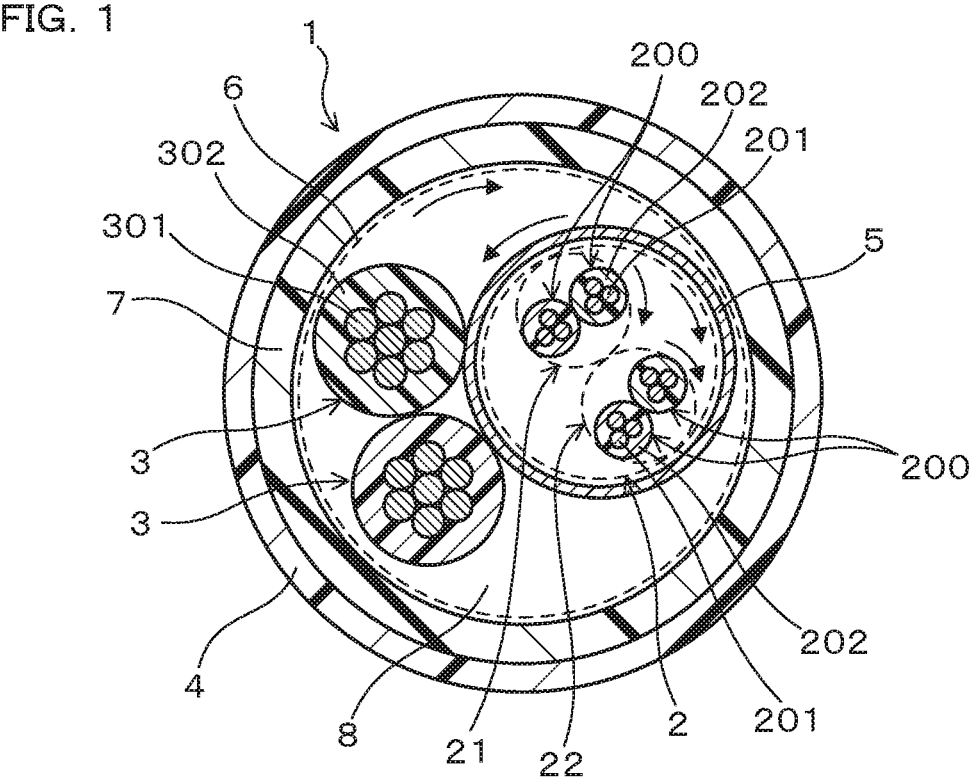
FIG. 1 is an illustration schematically showing a composite cable according to Embodiment 1 in a cross section perpendicular to the center axis of the cable.
Figure 2:
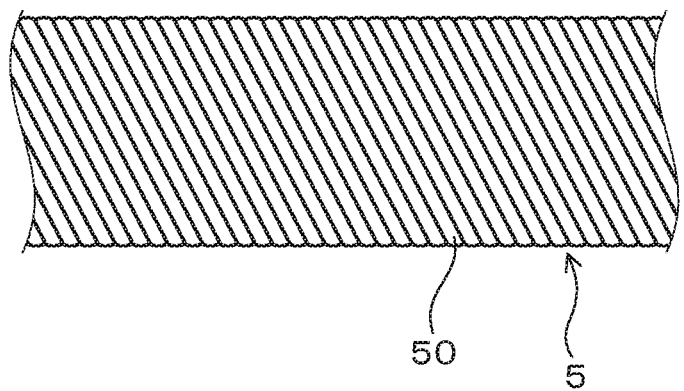
FIG. 2 is an illustration schematically showing an external view of a signal line covered with a shield conductor in the composite cable according to Embodiment 1.

A composite cable of Embodiment 1 will be described with reference to FIG. 1 to FIG. 3. As shown in FIG. 1 and FIG. 2, a composite cable 1 of the present embodiment includes a signal line part 2, a pair of power supply lines 3, and a sheath 4. A detailed explanation will be given hereafter. It is noted that the dotted-line circles in FIG. 1 show to be stranded wires, and the arrows represent twisting directions.

The signal line part 2 includes a first signal line 21 and a second signal line 22, Each of the first signal line 21 and the second signal line 22 is made up of a pair of wires 200 twisted together. In the present embodiment, the twisting directions of the first signal line 21 and the second signal line 22 are the same as shown in FIG. 1, And, the pair of wires 200 includes a conductor 201 and an insulator 202 that covers the outer circumference of the conductor 201, respectively. The conductor 201 is made up of a plurality of metal element wires twisted together. The metal element wires may be formed of copper or copper alloy, or aluminum or aluminum alloy, and so on. The insulator 202 may be formed of, for example, cross-linked polyethylene (PE), or the like.

The signal line part 2 is made up of the first signal line 21 and the second signal line 22 twisted together. In the present embodiment, the twisting direction of the signal line part 2 is the same as those of the first signal line 21 and the second signal line 22 as shown in FIG. 1.

As shown in FIG. 2, the signal line part 2 is covered with a shield conductor 5. The shield conductor 5 is formed of a conductive element wire 50 spirally wound around the outer circumference of the signal line part 2. In the present embodiment, the shield conductor 5 is formed of a plurality of the conductive element wires 50 spirally wound around the outer circumference of the signal line part 2 for the sake of improvement in windability, etc. of the conductive element wire 50. As shown in FIG. 1, a winding direction of the conductive element wires 50 is set opposite to the twisting direction of the signal line part 2. In this way, the first signal line 21 and the second signal line 22 that constitute the signal line part 2 can be relatively uniformly covered with the conductive element wires 50.

Specifically, as the conductive element wire 50, a metal element wire can be used. It is noted that the metal mentioned in this specification includes any alloy. Examples of the conductive element wire 50 include, for example, a tin-plated soft copper wire, a copper alloy wire, an aluminum wire, and an aluminum alloy wire. In addition, as the conductive element wire 50, a metal foil wire, or the like formed by spirally winding a metal foil around the outer circumference of a resin fiber, can be used. As the resin fiber, for example, an aramid fiber, or the like can be exemplified. As the metal foil, a copper foil, a copper alloy foil, or the like can be exemplified. In the case where a metal foil wire is used as the conductive element wire 50, it advantageously works on improvements in the strength and flexibility of the shield conductor 5 in comparison with the case where a metal element wire is used as the conductive element wire 50. In the case where a metal element wire is used as the conductive element wire 50, it advantageously works on reduction of electric resistance, cost reduction, and so on in comparison with the case where a metal foil wire is used as the conductive element wire 50.

More specifically, in comparison between the above-mentioned tin-plated soft copper wire, the copper alloy wire, the copper foil wire (the aramid fiber plus the copper foil) in terms of tensile strength, the copper alloy wire has higher strength approximately by three to four times than that of the tin-plated soft copper wire as a basis. The copper foil wire has higher strength approximately by six to eight times than that of the tin-plated soft copper wire. Thus, among such conductive element wires 50, the copper foil wire is suitable for enhancing the strength of the shield conductor 5, Further in comparison between the above-mentioned tin-plated soft copper wire, the copper alloy wire, the copper foil wire (the aramid fiber plus the copper foil) in terms of flexibility against repeated bending, the copper alloy wire exhibits good followability to bending, and good flexibility. The copper foil wire is more excellent in flexibility than the copper alloy wire. Thus, among such conductive element wires 50, the copper foil wire is suitable for enhancing the flexibility of the shield conductor 5. Whereas, from the viewpoints of reduction of electric resistance and cost reduction, the tin-plated soft copper wire is advantageous. It is noted that if the shield conductor 5 is made of the metal foil itself, or is made of a resin tape having a metal deposited thereon, it is broken when the composite cable 1 is subjected to vertical vibration in a bending state. The reason why the metal foil wire is excellent in flexibility in spite of using the metal foil is that the tensile load is received by the resin fiber, so that the metal foil is hardly broken.

In the present embodiment, each of the pair of power supply lines 3 includes a conductor 301 and an insulator 302 that covers the outer circumference of the conductor 301, respectively. The conductor 301 is made up of a plurality of metal element wires twisted together. The metal element wires may be formed of, for example, copper or copper alloy, or aluminum or aluminum alloy, and so on. The insulator 302 can be formed of, for example, cross-linked polyethylene (PE), etc. And, the outer diameters of the pair of power supply lines 3 are made smaller than that of the signal line part 2.

In the composite cable 1, at least the signal line part 2 having the outer circumference covered with the shield conductor 5, and the pair of power supply lines 3 are twisted together to constitute a wire bundle 6. In the present embodiment, the power supply lines 3 in pairs are in contact with each other. And, the pair of power supply lines 3 is in contact with the shield conductor 5 of the signal line part 2.

The outer circumference of the wire bundle 6 is covered with the sheath 4. The sheath 4 may be formed of, for example, polyurethane resin (PU), or the like.

In the present embodiment, in order that the cross section of the cable is easily made circular, a interposing layer 7 may be arranged between the outer circumference of the wire bundle 6 and the sheath 4. The interposing layer 7 may be formed of, for example, a cross-linked polyethylene (PE), or the like. It is noted that in the present embodiment, a space 8 is provided between the wire bundle 6 and the interposing layer 7.

In the composite cable 1 of the present embodiment, the signal line part 2 is covered with the shield conductor 5 formed of the conductive element wire 50 spirally wounded around the signal line part 2. This shield conductor 5 improves the shape retainability of the signal line part 2. Thus, even when the composite cable 1 is subjected to vertical vibration in a bending state, it becomes hard for the signal line part 2 to bend rapidly, so that tensile forces to be applied to the first signal line 21 and the second signal line 22 can be reduced. In addition, according to the composite cable 1, the rigidity of the cable is improved by the shield conductor 5 in comparison with the conventional composite cable that has no shield conductor provided. Consequently, it is made possible to restrain the horizontal shaking of the composite cable 1 when subjected to vertical vibration in a bending state. In addition, because the shield conductor 5 has almost no restriction in movement of the conductive element wire 50 when the cable is horizontally shaking so as to produce gaps between the winding of the element wire, the composite cable is excellent in followability to bending and has good flexibility.

Accordingly, the composite cable 1 makes it possible to enhance the disconnection resistance of the first signal line 21 and the second signal line 22.

Figure 3:
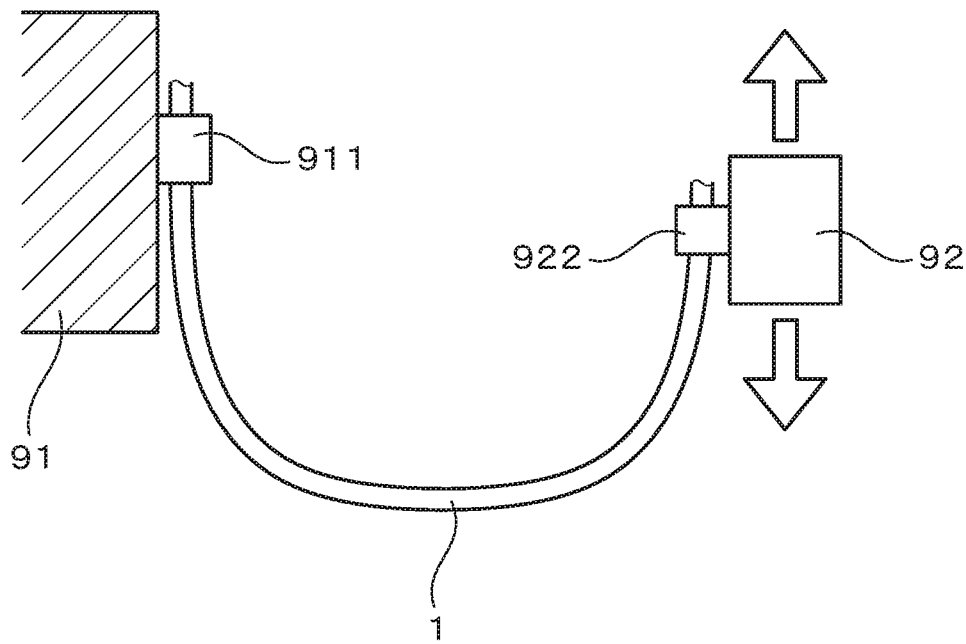
FIG. 3 is an illustration schematically showing an application example of the composite cable according to Embodiment 1.

In the present embodiment, the composite cable 1 can be used in such a condition, specifically as shown in FIG. 3, that one end side of the cable is fixed to a stable-side portion 91, and the other end side of the cable is attached to a vertically-vibrating portion 92. According to such a configuration, the above-mentioned operational effects can be surely obtained, so that the first signal line 21 and the second signal line 22 can be surely restrained from being disconnected around the cable fixing portion. The case of applying the composite cable 1 to an automotive electric brake will be described below. It is noted that in the automotive electric brake, a motor equipped on a brake caliper is actuated directly or indirectly by a main electronic control unit in accordance with a pedaling force of a driver, and the rotating force of the motor is converted to a mechanical pressing pressure. Consequently, the brake pad is pressed against the brake disc (in the case of a disc brake), or the brake shoe is pressed against the brake drum (in the case of a drum brake) to thereby brake the automobile.

When the composite cable 1 is applied to an automotive electric brake, the one end side of the composite cable 1 can be specifically fixed to a vehicle body or an undercarriage, the other end side of the cable may be attached to a portion around a wheel where vertical vibration arises. It is noted that the portion around a wheel specifically includes the lower portion of the suspension spring of an automobile (so-called the underbody part (a chassis) of an automobile), or the like. Further, the composite cable 1 may be fixed at one location or at plural locations on the one end side of the cable. Similarly, the composite cable 1 may be fixed at one location or at plural locations on the other end side of the cable. For fixing the composite cable 1 as mentioned above, a fixing bracket 911 may be used, and for attaching the composite cable 1 as mentioned above, an attachment bracket 922 may be used.

In the present embodiment, the main electronic control unit (a main ECU) is mounted on a vehicle body or an undercarriage. Further, a subsidiary electronic control unit(s) (a sub ECU) is(are) mounted on a wheel and/or a portion around a wheel. Still further, a wheel velocity sensor(s) for detecting the rotation velocity of the wheel is(are) mounted on a wheel and/or a portion around a wheel. In addition to the wheel velocity sensor, various sensors for measurement to acquire information necessary for control of a motor, such as a motor operation confirming sensor for confirming operation of the motor equipped on the brake caliper of the automotive electric brake, a motor temperature sensor for measuring the temperature of the motor, a motor rotation angle sensor for measuring the rotation angle of the motor, a motor current sensor for measuring the current supplied to the motor, a press sensor for detecting the braking force, and the like, are provided on a wheel and/or a portion around a wheel.

In the present embodiment, the first signal line 21 can be configured to transmit an electrical signal concerning the rotation velocity of the wheel. The second signal line 22 can be configured to transmit at least an electrical signal concerning control of the motor. The pair of power supply lines 3 can be configured to supply an electric power for driving the motor. According to this configuration, it hardly occurs that the first signal line 21 and the second signal line 22 are disconnected around the cable fixing portion even when the one end side of the composite cable 1 is fixed to the vehicle body or the undercarriage. Thus, the composite cable 1 that is advantageous for improvement in the durability of an electric brake, and enhancement of the reliability.

In the above-mentioned case, the first signal line 21 may be connected specifically to the main electronic control unit at the one end of the cable, and to the wheel velocity sensor at the other end of the cable. The second signal line 22 may be connected specifically to the main electronic control unit at the one end of the cable, and to the subsidiary electronic control unit at the other end of the cable. To the subsidiary electronic control unit, various sensors for measurement to acquire information necessary for control of the motor can be connected. It is noted that the various sensors can be connected to the subsidiary electronic control unit by a pair of sensor signal lines provided in each of the sensors. Each of the pair of the power supply lines 3 may be connected specifically to the main electronic control unit at the one end of the cable, and to the subsidiary electronic control unit at the other end of the cable. In this case, a three phase AC motor can be used as the motor, and the motor can be connected to the subsidiary electronic control by a wheel-side motor power supply line. Each of the pair of the power supply lines 3 can be otherwise connected to the main electronic control unit at the one end of the cable, and directly to the motor at the other end of the cable. As the motor In this case, a DC motor can be used. It is noted that the main electronic control unit and the subsidiary electronic control unit can be configured to be inter-communicable via the second signal line 22 of the composite cable 1.

In the case of applying the composite cable 1 to an electric brake, though the electric brake can be for both of a front wheel and a rear wheel, the electric brake for a rear wheel is preferable to be applied. The front wheel of an automobile turns right and left by steering. Therefore, the composite cable 1 applied to an electric brake for a front wheel is subjected not only to vertical vibration in a bending state but also to a torsional force. Because the shield conductor 5 is formed of the conductive element wire 50 spirally wound around the outer circumference of the signal line part 2, gaps between the winding of the element wire are extended when the torsion force is applied. In contrast, the rear wheel of an automobile does not turn right and left by steering. Thus, the composite cable 1 applied to an electric brake for a rear wheel is less subjected to a torsion force in comparison with the composite cable 1 applied to the electric brake for a front wheel. For this reason, according to the configuration in which the composite cable 1 is applied to the electric brake for a rear wheel, the flexibility of the shield conductor 5 hardly lowers, thus the above-mentioned operational effects can be fully exhibited easily.

Embodiment 2

A composite cable of Embodiment 2 will be described with reference to FIG. 4.

Figure 4:
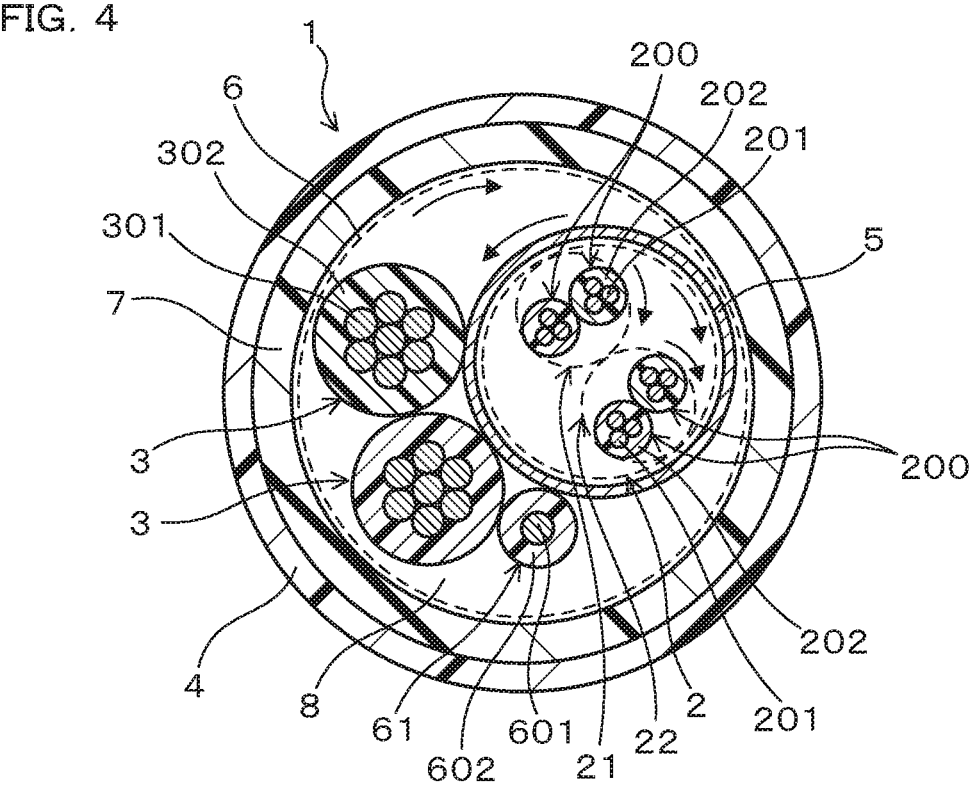
FIG. 4 is an illustration schematically showing a composite cable according to Embodiment 2 in a cross section perpendicular to the center axis of the cable.

As shown in FIG. 4, according to the present embodiment, the composite cable 1 includes a ground wire 61. Specifically, the wire bundle 6 further includes the ground wire 61 twisted together with the signal line part 2 and the pair of power supply lines 3.

According to this configuration, the following advantages are provided. Specifically, in the case of applying the composite cable 1 to an electric brake, the shield conductor 5 of the composite cable 1 according to Embodiment 1 can be grounded on the vehicle body or the under carriage at the one end side of the cable. However, the other end side of the cable is located on the wheel side, and thus grounding of the shield conductor 5 is difficult. In contrast, in the case of the present embodiment where the wire bundle 6 includes the ground wire 61, the shield conductor 5 and the ground wire 61 can be connected at the other end side of the cable. Consequently, the above-mentioned configuration has an advantage that the shieldability brought about by the shield conductor 5 can be surely exhibited even under the condition that grounding at the wheel side of the automobile would be restricted.

It is noted that the ground wire 61 may be specifically configured to include a conductor 601 and an insulator 602 that covers the outer circumference of the conductor 601. The conductor 601 can be formed of, for example, copper or copper alloy, or aluminum or aluminum alloy. The insulator 602 can be formed of, for example, cross-linked polyethylene (PE), or the like. Although FIG. 4 shows an example in which the ground wire 61 is arranged on the same side as the signal line part 2, the ground wire 61 may be arranged on the side opposite to the signal line part 2 with the pair of power supply lines 3 being interposed therebetween. The other configurations and operational effects are the same as those in Embodiment 1.

Embodiment 3

A composite cable of Embodiment 3 will be described with reference to FIG. 5.

Figure 5:
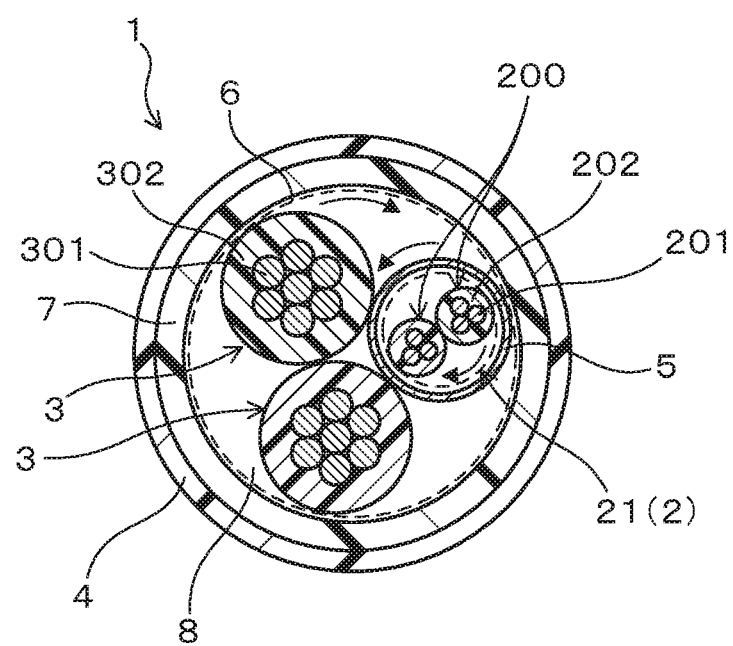
FIG. 5 is an illustration schematically showing a composite cable according to Embodiment 3 in a cross section perpendicular to the center axis of the cable.

As shown in FIG. 5, according to the present embodiment, the signal line part 2 of the composite cable 1 includes the first signal line 21, not including the second signal line 22. In other word, the present embodiment is an example in which the signal line part 2 is composed of the first signal line 21. Accordingly, the shield conductor 5 is formed of the conductive element wire 50 spirally wound around the outer circumference of the first signal line 21 serving as the signal line part 2. According to this configuration, it hardly occurs that the first signal line 21 is disconnected around the cable fixing portion even when the one end side of the composite cable 1 is fixed to the vehicle body or the undercarriage.

In the case of applying the composite cable 1 of the present embodiment to an automotive electric brake, the first signal line 21 of the composite cable 1 may be configured to transmit an electrical signal concerning the rotation velocity of a wheel, or may be configured to transmit at least an electrical signal concerning control of the motor. In the former case, the electric brake can be constituted further using any other signal line separately for transmitting at least the electrical signal concerning control of the motor in addition to the composite cable 1. Similarly, in the latter case, the electric brake can be constituted further using any other signal line separately for transmitting the electrical signal concerning the rotation velocity of a wheel in addition to the composite cable 1.

The present invention is not limited to the above-mentioned embodiments, and various modifications can be made within the scope that does not depart from the spirit of the present invention. The configurations shown in the embodiments can be arbitrarily combined with each other.

The invention claimed is:

1. A composite cable, comprising:
   a signal line part including a first signal line composed of a pair of wires twisted together;
   a pair of power supply lines; and
   a sheath that covers an outer circumference of a wire bundle composed of the signal line part and the pair of power supply lines, the signal line part and the pair of power supply lines being twisted together;
   wherein the signal line part is covered with a shield conductor formed of a conductive element wire spirally wound around an outer circumference of the signal line part,
   the signal line part further includes a second signal line composed of a pair of wires twisted together, and the first signal line and the second signal line are twisted together, and
   a twisting direction of the signal line part is the same as those of the first signal line and the second signal line, and a winding direction of the conductive element wires is set opposite to the twisting direction of the signal line part.

2. The composite cable according to claim 1, wherein the conductive element wire is a metal element wire, or a metal foil wire formed by spirally winding a metal foil around an outer circumference of a resin fiber.

3. The composite cable according to claim 2, wherein the wire bundle further includes a ground wire twisted together with the signal line part and the pair of power supply lines.

4. The composite cable according to claim 2, wherein an one end side of the composite cable is configured to be fixed stably to a vehicle body, and an other end side of the composite cable is configured to be attached to a portion where vertical vibration arises.

5. The composite cable according to claim 2, wherein
   the composite cable is for use in an automotive electric brake,
   an one end side of the composite cable is configured to be fixed to a vehicle body or an undercarriage, and an other end side of the composite cable is configured to be attached to a portion around a wheel where vertical vibration arises,
   the first signal line is configured to transmit an electrical signal concerning a rotation velocity of a wheel, or is configured to transmit at least an electrical signal concerning control of a motor equipped on a brake caliper of the electric brake, and
   the pair of the power supply lines are configured to supply an electric power for driving the motor.

6. The composite cable according to claim 2, wherein
   the composite cable is for use in an automotive electric brake,
   an one end side of the composite cable is configured to be fixed to a vehicle body or an undercarriage, and an other end side of the composite cable is configured to be attached to a portion around a wheel where vertical vibration arises,
   the first signal line is configured to transmit an electrical signal concerning a rotation velocity of a wheel,
   the second signal line is configured to transmit at least an electrical signal concerning control of a motor equipped on a brake caliper of the electric brake, and
   the pair of the power supply lines are configured to supply an electric power for driving the motor.

7. The composite cable according to claim 1, wherein the wire bundle further includes a ground wire twisted together with the signal line part and the pair of power supply lines.

8. The composite cable according to claim 1, wherein an one end side of the composite cable is configured to be fixed stably to a vehicle body, and an other end side of the composite cable is configured to be attached to a portion where vertical vibration arises.

9. The composite cable according to claim 1, wherein
   the composite cable is for use in an automotive electric brake,
   an one end side of the composite cable is configured to be fixed to a vehicle body or an undercarriage, and an other end side of the composite cable is configured to be attached to a portion around a wheel where vertical vibration arises,
   the first signal line is configured to transmit an electrical signal concerning a rotation velocity of a wheel, or is configured to transmit at least an electrical signal concerning control of a motor equipped on a brake caliper of the electric brake, and
   the pair of the power supply lines are configured to supply an electric power for driving the motor.

10. The composite cable according to claim 9, wherein the electric brake is a rear wheel electric brake.

11. The composite cable according to claim 1, wherein
    the composite cable is for use in an automotive electric brake, an one end side of the composite cable is configured to be fixed to a vehicle body or an undercarriage, and an other end side of the composite cable is configured to be attached to a portion around a wheel where vertical vibration arises, the first signal line is configured to transmit an electrical signal concerning a rotation velocity of a wheel, the second signal line is configured to transmit at least an electrical signal concerning control of a motor equipped on a brake caliper of the electric brake, and the pair of the power supply lines are configured to supply an electric power for driving the motor.

12. The composite cable according to claim 11, wherein the electric brake is a rear wheel electric brake.

13. The composite cable according to claim 1, wherein the outer diameters of the pair of power supply lines are smaller than that of the signal line part.

14. A composite cable, comprising:
a signal line part including a first signal line composed of a pair of wires twisted together;
a pair of power supply lines; and
a sheath that covers an outer circumference of a wire bundle composed of the signal line part and the pair of power supply lines, the signal line part and the pair of power supply lines being twisted together;
wherein the signal line part is covered with a shield conductor formed of a conductive element wire spirally wound around an outer circumference of the signal line part,
the signal line part further includes a second signal line composed of a pair of wires twisted together, and the first signal line and the second signal line are twisted together,
the conductive element wire is a metal element wire, or a metal foil wire formed by spirally winding a metal foil around an outer circumference of a resin fiber, and
wherein the wire bundle further includes a ground wire twisted together with the signal line part and the pair of power supply lines,
wherein the shield conductor and the ground wire are connected to each other on either one end of the composite cable,
the shield conductor of the composite cable is grounded on a vehicle body or an under carriage at the one end side of the composite cable, and
the shield conductor and the ground wire are connected at the other end side of the composite cable.

15. The composite cable according to claim 14, wherein the outer diameters of the pair of power supply lines are smaller than that of the signal line part, and
wherein a twisting direction of the signal line part is the same as those of the first signal line and the second signal line, and a winding direction of the conductive element wires is set opposite to the twisting direction of the signal line part.

16. The composite cable according to claim 14, wherein the pair of power supply lines is in contact with the shield conductor of the signal line part,
wherein a twisting direction of the signal line part is the same as those of the first signal line and the second signal line, and a winding direction of the conductive element wires is set opposite to the twisting direction of the signal line part.

17. A composite cable, comprising:
a signal line part including a first signal line composed of a pair of wires twisted together;
a pair of power supply lines; and
a sheath that covers an outer circumference of a wire bundle composed of the signal line part and the pair of power supply lines, the signal line part and the pair of power supply lines being twisted together;
wherein the signal line part is covered with a shield conductor formed of a conductive element wire spirally wound around an outer circumference of the signal line part,
the signal line part further includes a second signal line composed of a pair of wires twisted together, and the first signal line and the second signal line are twisted together, and
wherein the pair of power supply lines is in contact with the shield conductor of the signal line part.

18. The composite cable according to claim 17, wherein the conductive element wire is a metal element wire, or a metal foil wire formed by spirally winding a metal foil around an outer circumference of a resin fiber.

19. The composite cable according to claim 17, wherein the wire bundle further includes a ground wire twisted together with the signal line part and the pair of power supply lines.

20. A composite cable, comprising:
a signal line part including a first signal line composed of a pair of wires twisted together;
a pair of power supply lines; and
a sheath that covers an outer circumference of a wire bundle composed of the signal line part and the pair of power supply lines, the signal line part and the pair of power supply lines being twisted together;
wherein the signal line part is covered with a shield conductor formed of a conductive element wire spirally wound around an outer circumference of the signal line part, the signal line part further includes a second signal line composed of a pair of wires twisted together, and the first signal line and the second signal line are twisted together,
wherein the conductive element wire is a metal element wire, or a metal foil wire formed by spirally winding a metal foil around an outer circumference of a resin fiber,
wherein the wire bundle further includes a ground wire twisted together with the signal line part and the pair of power supply lines,
wherein the shield conductor and the ground wire are connected to each other on either one end of the composite cable, the shield conductor of the composite cable is grounded on a vehicle body or an under carriage at the one end side of the composite cable,
the shield conductor and the ground wire are connected at the other end side of the composite cable,
wherein the pair of power supply lines is in contact with the shield conductor of the signal line part,
wherein the outer diameters of the pair of power supply lines are smaller than that of the signal line part, and
wherein a twisting direction of the signal line part is the same as those of the first signal line and the second signal line, and a winding direction of the conductive element wires is set opposite to the twisting direction of the signal line part.

* * * * *